A. S. CUBITT.
ELECTRIC TOASTER.
APPLICATION FILED NOV. 17, 1909.
1,021,239. Patented Mar. 26, 1912.
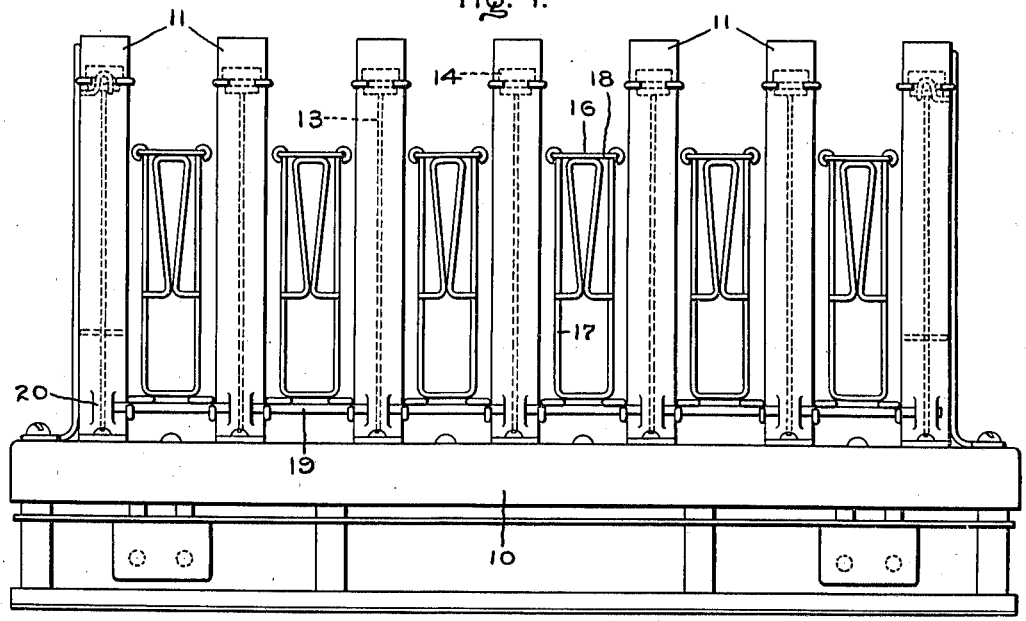
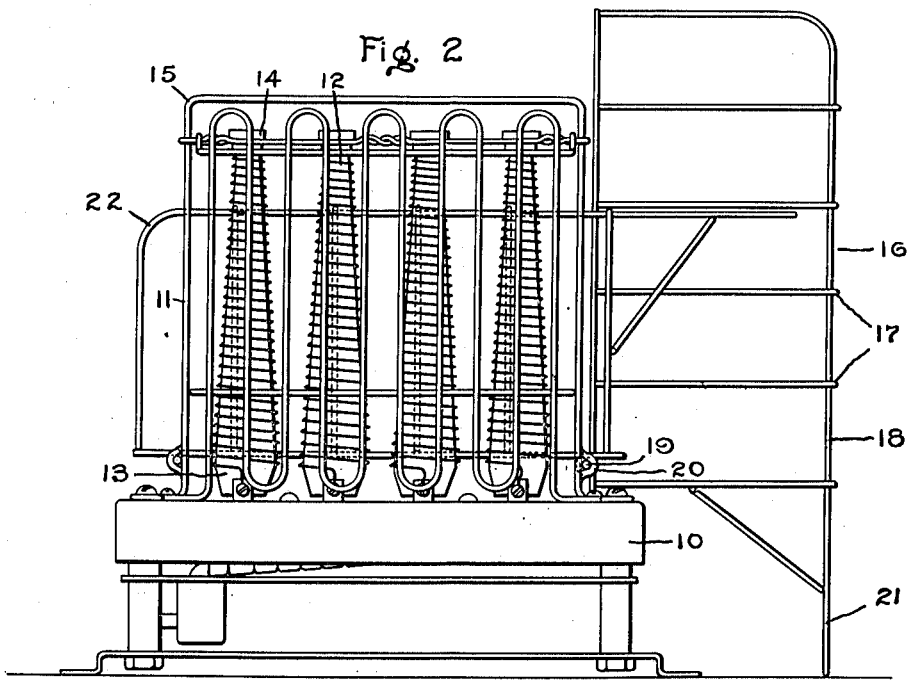
WITNESSES:
Lester H. Fulmer
J. Ellis Glen
INVENTOR
ARCHIBALD S. CUBITT.
BY
HIS ATTORNEY.

UNITED STATES PATENT OFFICE.

ARCHIBALD S. CUBITT, OF PITTSFIELD, MASSACHUSETTS, ASSIGNOR TO GENERAL ELECTRIC COMPANY, A CORPORATION OF NEW YORK.

ELECTRIC TOASTER.

1,021,239.  Specification of Letters Patent.  Patented Mar. 26, 1912.

Application filed November 17, 1909. Serial No. 528,486.

*To all whom it may concern:*

Be it known that I, ARCHIBALD S. CUBITT, a subject of the King of Great Britain, residing at Pittsfield, county of Berkshire, State of Massachusetts, have invented certain new and useful Improvements in Electric Toasters, of which the following is a specification.

This invention relates to electric heating devices and has for its object the provision of an improved cooking utensil of the type in which the cooking is entirely done by radiant heat.

My invention relates more specifically to cooking utensils which can be used for toasting, although it is evident that broiling may be done on a device of similar design.

One of the objects of my invention is to produce a device of this character in which the bread to be toasted can be conveniently placed in toasting position.

In carrying out my invention I provide a plurality of frames for supporting the bread to be toasted, which frames are movable with respect to the heating devices. I preferably employ a plurality of heating units and a plurality of movable frames adjacent thereto, so that the bread will be toasted on both sides at the same time.

Other objects of my invention will appear in the course of the following specification in which I have shown my invention embodied in concrete mechanism for purposes of illustration.

In the drawings disclosing one embodiment of my invention, Figure 1 is a side elevation of my toaster; and Fig. 2 is an end elevation of the same with one of the toasting frames moved out of toasting position.

Referring to the drawings, 10 represents a base which is preferably of some insulating material, such as porcelain or the like. Upon this base are supported a number of heating devices 11. In this case I have shown seven parallel devices spaced from each other. Each device consists of four heating units 12. The particular construction of these heating units and their arrangement in each device forms no part of my invention, since a construction of this type is disclosed in the patent to Shailor, No. 950,058. Briefly, the heating device consists of four insulating supports 13, of material such as mica or the like, in the form of strips which are narrowed near the top. These strips are supported at their upper end in insulating buttons 14, which buttons are supported in the wire framework. The wire frame of each heating device is substantially the same as that disclosed in the above patent, there being an inverted U-shaped frame 15 consisting of a strip of metal forming an outside frame to lend rigidity to the structure and to provide a bearing for the toasting frame. The cross frame supporting the buttons 14 is itself supported on frame 15. The toasting frames 16 consist of a plurality of U-shaped wires 17 having their ends bent over the wire 18 which forms two edges of the frame. These U-shaped frames are adapted to receive the bread which is to be toasted and the frame as a whole is pivoted to the rod 19, which rod is secured in lugs 20 in the frames 15. The top frame 18 is extended, as shown at 21, beyond the heating device, so as to form a handle and also act as a support when the frames are moved into the vertical position shown in Fig. 2.

It will be seen that in using this device the frames are first moved into a vertical position and the bread inserted. The frames are then rotated on their pivots until they assume the position of the frame shown at 22. At any time during the toasting operation the bread may be inspected by simply tilting the frame. By this arrangement, the bread is simultaneously toasted on both sides in a very simple manner, and may be inserted, removed and inspected without danger to the operator of being burned.

Various modifications of my invention will suggest themselves to those skilled in the art, but it should be understood that I do not limit my invention to the arrangement shown herein except in so far as it is covered by the scope of the claims annexed hereto.

What I claim as new and desire to secure by Letters Patent of the United States, is:—

1. An electric toaster comprising a plurality of electric heating devices, and a plurality of toasting frames pivoted between the devices and movable into and out of proximity thereto.

2. An electric toaster comprising a plurality of electric heating devices, and a plurality of pivoted toasting frames each between adjacent devices and movable into and out of proximity thereto.

3. An electric toaster comprising a plurality of heating devices arranged in parallel planes and a plurality of toasting frames pivotally mounted between adjacent heating devices and movable into and out of proximity thereto.

4. An electric toaster comprising a plurality of heating devices arranged in parallel vertical planes, a plurality of toasting frames pivotally mounted for movement parallel therewith, each frame being movable independently of the others into and out of a position between the devices.

5. An electric toaster comprising a plurality of heating devices arranged in parallel vertical planes, a plurality of toasting frames alternating therewith and pivotally mounted for movement independently of each other into and out of position between the devices, and a projection on each frame forming a handle for moving the same and acting to support the frame in its outer position.

In witness whereof, I have hereunto set my hand this 16th day of November, 1909.

ARCHIBALD S. CUBITT.

Witnesses:
 BENJAMIN B. HULL,
 HELEN ORFORD.